Patented Nov. 28, 1939

2,181,672

UNITED STATES PATENT OFFICE 2,181,672

ADSORBENT FILTER

Edgar Rouse Sutcliffe, Lowton, Newton-Le-Willows, and William Ernest Edwards, Leigh, England; said Edwards assignor to Sutcliffe, Speakman & Company Limited, Leigh, Lancashire, England, a joint-stock corporation Application October 13, 1937, Serial No. 168,728
In Great Britain March 25, 1936

3 Claims. (Cl. 252—4)

This invention relates to adsorbent filters such as are commonly employed for the recovery by adsorption of vapours or liquids, of the kind in which active carbon or other adsorbent substance is employed as the filtering material.

The invention is of special application in the recovery of solvents from solvent laden air but it is also of general application in the recovery of liquids by adsorption.

According to the present invention the adsorbent filter is provided with a cooling jacket applied around or incorporated within the external peripheral wall of the filter casing, through which cooling water or other cooling liquid may be caused to pass, and a narrow annular space is provided between the external peripheral wall of the container of the adsorbent filtering material and the jacketed peripheral wall of the casing, whereby the adsorbent filter is thus equipped to serve as a condenser.

In adsorption filters it is usual to employ steam or inert gas for the purpose of flushing the filtering material after it has become partially or completely charged with the solvent or other substance to be recovered and according to the invention the solvent or other substance to be recovered is in the flushing operation condensed within the filter casing and is recovered together with water when steam is used in the flushing operation.

According to the invention this effect is secured by the provision of a jacket surrounding or incorporated in the outer wall of the filter casing through which a cooling fluid such as water may be caused to pass and the solvent or other substance to be recovered together with the steam when used as a flushing agent may condense upon the inner surface of the filter casing and accumulate in the lower part of the casing whence it may be removed or discharged. By such means the use of a separate condenser is not required for the condensation of the solvent or other substances recovered by adsorption in the filter.

The invention comprises an adsorbent filter as hereinafter described adapted to serve as a condenser and for carrying out filtration under the stated conditions of the recovery of the adsorbed solvent or other substance as a liquid by condensation within the filter casing, and the invention also comprises the constructional features of such a filter.

Figure 1:
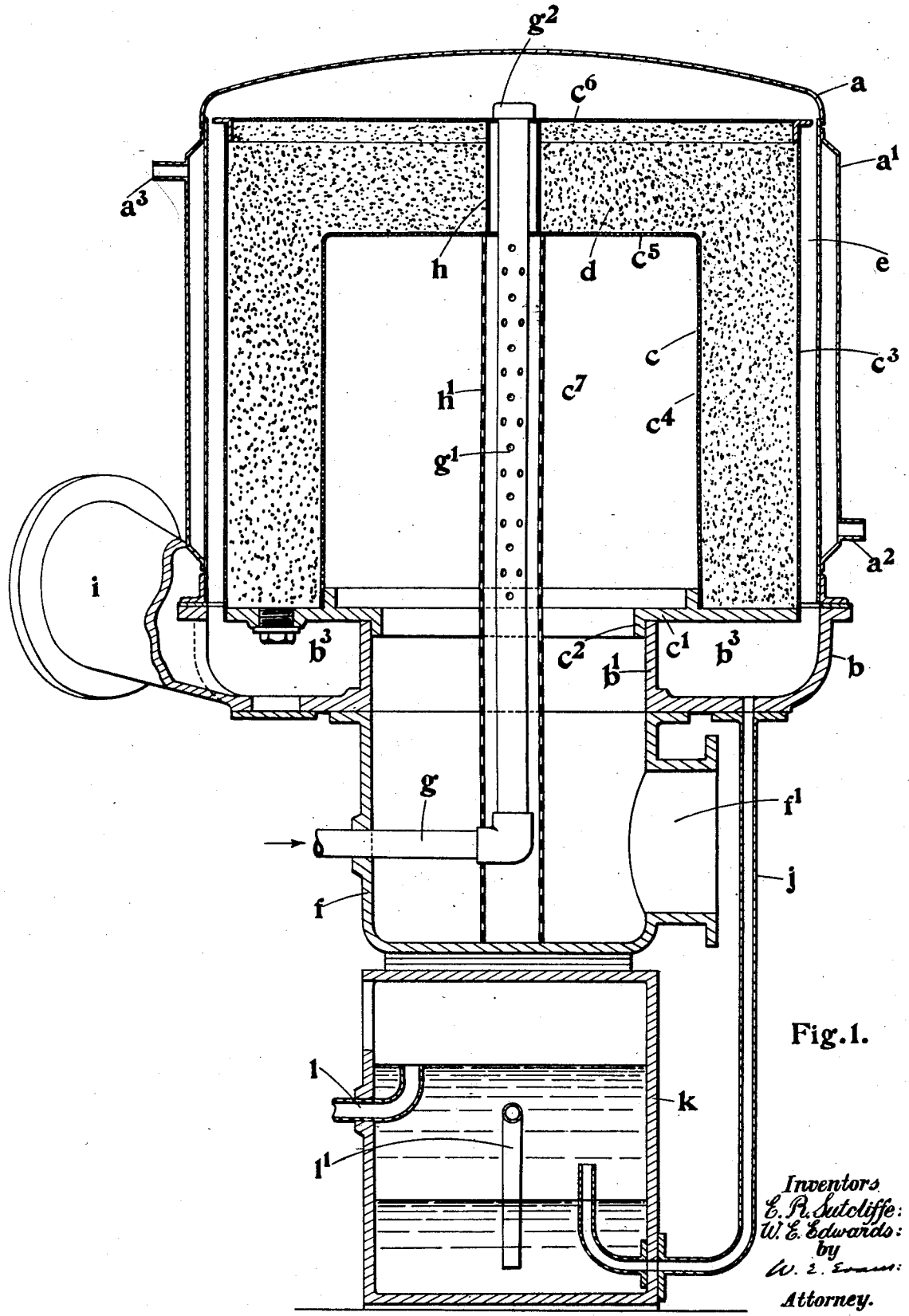

The invention is illustrated by way of example in the accompanying drawings in which Figure 1 is a vertical transverse cross-section of an adsorbent filter equipped according to the invention.

Figure 2:
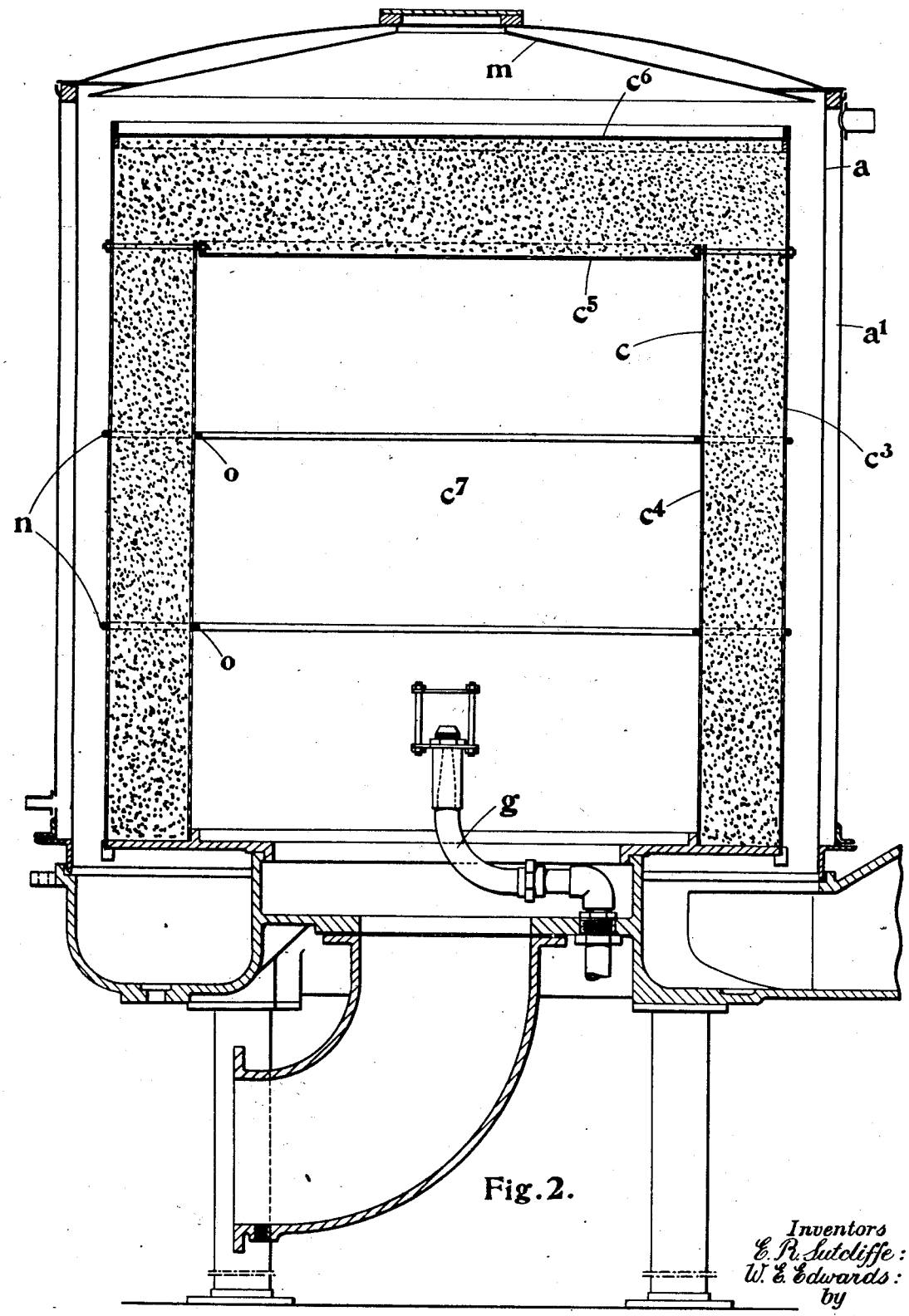

Figure 2 is a corresponding view of a modification.

In carrying the invention into effect as illustrated in the accompanying drawings, the adsorbent filter comprises a cylindrical casing $a$, the main peripheral wall of which is provided with an external cooling jacket $a^1$, the base $b$ of the casing being provided of an annular form for the support of a cylindrical container $c$ for the active carbon or other adsorbent filtering material $d$. The container comprises as annular supporting plate $c^1$ that is supported upon an inner flange $b^1$ and the plate $c^1$ is itself provided with a downwardly extending inner flange $c^2$ by which the upper part of the container $c$ is maintained in its concentric relation with the base $b$ and the inner flange $b^1$ and the main part of the cylindrical casing $a$ of the filter is supported upon the outer flange of the base $b$. By such means an annular cavity $b^3$ of substantial volume is provided in position beneath the overhanging part of the annular supporting plate $c^1$ and a narrow annular space $e$ is provided between the external peripheral perforated wall or screen $c^3$ and the internal surface of the main part of the casing $a$. A corresponding narrow annular space is provided between the outer edge of the annular supporting plate $c^1$ of the container and the concentric outer flange of the base part $b$, which supports the main part of the casing $a$. The container $c$ is advantageously provided of two concentric peripheral walls or screens $c^3$, $c^4$, each of which may be perforated or otherwise provided of gauze mounted upon concentric cylindrical frames or the equivalent and the external wall $c^3$ may extend upwardly beyond the internal wall $c^4$ in order that a layer of filtering material $d$ may extend across the upper part of the container to a substantial depth that is advantageously not substantially less than the width of the annular cavity of the container.

The external and internal walls of the container have respectively applied upon them a top of gauze or perforated metal $c^5$, $c^6$ suitably supported. The base $b$ is advantageously mounted upon a base pedestal or fitting $f$ by which a lateral outlet $f^1$ may be provided for the accommodation of the outlet pipe connection for the air or gas from which the solvent or other substance is removed on passage through the filter. A steam pipe $g$ is advantageously mounted in the pedestal base $f$ having an upstanding and centrally disposed part $g^1$ perforated for the main part of its length and the upper end of the centrally disposed part $g^1$ of the steam pipe $g$ extends to the top wall of gauze or perforated metal $c^6$ and is provided with a cap $g^2$ or other fitting by which the part $c^6$ is retained in position on the outer peripheral wall $c^3$ of the container.

Between the walls of gauze or perforated metal $c^6$, $c^5$ a tubular part $h$ is mounted upon the upwardly extending part $g^1$ of the steam pipe and the upwardly extending part $g^1$ beneath is perforated throughout its length and is enclosed within a surrounding perforated baffle tube $h^1$ of substantially larger diameter than the part $g^1$ of the steam pipe. By the provision of the perforated baffle tube $h^1$ the effect is avoided of water being blown directly out of the steam pipe $g$ with steam directly on to the carbon. The lower end of the perforated outer tube $h^1$ is supported at the pedestal base $f$ and the upper part extends right to the underside of the gauze or perforated metal plate $c^5$ and serves as a support for it.

A suitable inlet $i$ is provided for the air or gas to be filtered which may be integrally formed with the base part $b$ of the casing. An inlet $a^2$ for cooling water or other cooling liquid may be provided near the lower part of the external jacket $a^1$ and in a diametrically opposite position and near the top of the jacket an outlet $a^3$ for the cooling water may be provided.

It will be understood that immediately preceding and during the flushing operation with steam or other inert gas the circulation of cooling water is maintained in the jacket $a^1$ for the purpose of causing condensation of the solvent or other substances previously adsorbed by the filter together with steam when steam is used. The outlet pipe $j$ for the condensed liquid or liquids may be provided at a position beneath the supporting base part $b$ of the casing and the lower end of the outlet pipe $j$ may be passed into a separating tank $k$ where two overflow pipes $l$, $l^1$ may be provided respectively for water and for the solvent or other liquid recovered from the filter. Thus if the liquid recovered is trichlorethylene having a higher specific gravity than water the water will separate above the trichlorethylene. Thus the upper overflow pipe $l$ will serve as the outlet for water and the lower overflow pipe $l^1$ will serve for trichlorethylene. If however benzene or other lighter bodies are being recovered then the water is separated in the lower layer. The boiling point of trichlorethylene is 87° C. and that of benzene ($C_6H_6$) 80.08° C.

It will be understood that in operation the solvent laden air or other gas containing vapours to be recovered enters through the inlet $i$, and passes upwardly through the annular space $e$ and passing into the container through the outer walls $c^3$ and $c^6$ and issuing into the central space $c^7$ in the container, and thence passing through the outlet $f^1$. When the filtering material has been charged or partially charged to the extent required with the substance or substances to be recovered, the charging operation is discontinued whereupon the flushing operation commences after first cooling water has been circulated through the external cooling jacket $a^1$ whereupon steam is admitted through the inlet pipe $g$ passing into the central space $c^7$ in the container and thence radially outward and upward and passing downwardly through the narrow annular space $e$, the steam and the substance or substances flushed out of the filtering material by it being condensed on the inner surface of the jacketed external wall of the casing and accumulated in the base part $b$ whence it flows into the separating tank and from which it is discharged through the overflow pipes $l$, $l^1$.

It will be understood that in the flushing phase the temperature of the cooling liquid is maintained at a low degree and drastic conditions of condensation maintained on the vapours impinging upon the inner surface of the peripheral wall of the casing.

As illustrated in Figure 2 there may be provided in position above the container $c$ a hood $m$ of conical form supported in a central position from the top of the casing $a$ and extending downwardly and outwardly with its peripheral edge beyond the container $c$. By such means the drenching of the carbon with water condensed on the under face of the top part of the casing $a$ is avoided, it being understood that the conical hood will in use rapidly become heated and that the condensed water will run off the hood and drop directly down the annular space $e$ between the container and the casing whereby it does not pass into the filtering material.

In the modification illustrated in Figure 2 the peripheral walls $c^3$ and $c^4$ are supported in position by exterior and interior rings $n$, $o$. Similar provision of the conical hood $m$ and the reinforcing rings $n$, $o$ may be provided in the construction as illustrated in Figure 1.

We are aware that it has before been proposed to provide a jacketed adsorption filter through the jacket of which cold water may be passed after the flushing and drying operation.

We claim:

1. A method for the cleansing of an absorbent filtering medium containing solvent material which comprises passing steam into a central space at the interior portion of the filtering medium to be cleansed and permitting the steam to pass through the body of the filtering medium to the exterior portion thereof, condensing all of the steam and solvent material immediately adjacent the exterior portion of the filtering medium by means of a cooling surface cooled to effect complete condensation thereon, collecting the said condensed steam and solvent material immediately below the said cooling surface and passing the same to a separating zone provided with means to discharge the condensate without the discharge of vapors.

2. A filtering apparatus having provision for the cleansing of an absorbent filtering medium containing solvent material which comprises an outer casing, perforated holding means within said casing for retaining said filtering medium immediately adjacent but spaced from the inner wall of said outer casing and having a central space at the interior portion of the said holding means, a jacket surrounding said outer casing adjacent the filtering medium to permit cooling of the said inner surface adjacent the filtering medium, means for passing a condensable heating medium into the said central space, a collecting chamber immediately below said holding means, a separating chamber provided with means to discharge the condensate without the discharge of vapors, and a conduit for passing the condensed material from the collecting chamber to said separating chamber.

3. A filtering apparatus having provision for the cleansing of an absorbent filtering medium containing solvent material which comprises an outer casing, an inverted cup-shaped holding means having inner and outer perforated walls for retaining the filtering medium within the casing immediately adjacent but spaced from the inner wall of the outer casing, the said holding means providing a central space within the said inner wall, a jacket surrounding the said outer casing at the portion adjacent the said filtering medium to permit cooling of vapors immediately upon release from the said filtering medium against the said inner wall of the outer casing, a conduit having perforations therein in the said central space to permit passage of a condensable heating medium into the said central space for passage through the body of the filtering material to the outer surface thereof, a collecting trough immediately below the inner wall of the outer casing to collect the liquid condensed on and discharged from said surface, a separating chamber immediately below the said collecting trough, a drain pipe for passing the condensed material from the collecting trough to the said separating chamber and an outlet to the separating chamber providing a trapped discharge for the condensate from the separating chamber.

EDGAR ROUSE SUTCLIFFE.
WILLIAM ERNEST EDWARDS.